United States Patent [19]

Koch

[11] Patent Number: 5,106,958
[45] Date of Patent: Apr. 21, 1992

[54] 1:1 COPPER COMPLEXES OF FURTHER UNSUBSTITUTED OR SUBSTITUTED 6-(2'-CHLORO-4'-SUBSTITUTED AMINO-1,3,5-TRIAZIN-6'-YLAMINO)-1-HYDROXY-2-(2'-HYDROXY-5'-SULFOPHENYLAZO)-3-SULFONAPHTHALENES

[75] Inventor: Werner Koch, Oberwil, Switzerland

[73] Assignee: Sandoz Ltd., Basel, Switzerland

[21] Appl. No.: 673,435

[22] Filed: Mar. 22, 1991

Related U.S. Application Data

[63] Continuation of Ser. No. 289,170, Dec. 23, 1988, abandoned, which is a continuation of Ser. No. 931,384, Nov. 14, 1986, abandoned.

[30] Foreign Application Priority Data

Nov. 21, 1985 [DE] Fed. Rep. of Germany ....... 3541159

[51] Int. Cl.$^5$ ............... C09B 62/095; C09B 67/22; D06P 1/382
[52] U.S. Cl. .................................... 534/622; 534/628; 8/549
[58] Field of Search ............... 534/622, 628; 8/549

[56] References Cited

U.S. PATENT DOCUMENTS

| | | | |
|---|---|---|---|
| 2,929,809 | 3/1960 | Menzi et al. | 534/701 |
| 3,043,649 | 7/1962 | Wegmann | 8/543 |
| 3,065,221 | 11/1962 | Vellins | 534/701 |
| 3,133,909 | 5/1964 | Riat | 534/622 |
| 3,354,140 | 11/1967 | Benz | 534/622 |
| 3,413,077 | 11/1968 | Bertin, I et al. | 8/549 |
| 3,546,201 | 12/1970 | Bertin, II et al. | 534/622 X |
| 4,115,378 | 9/1978 | Bien et al. | 534/622 X |

FOREIGN PATENT DOCUMENTS

| | | |
|---|---|---|
| 631784 | 11/1961 | Canada . |
| 41919 | 12/1981 | European Pat. Off. . |
| 1102317 | 3/1961 | Fed. Rep. of Germany . |
| 1207616 | 2/1960 | France . |
| 636895 | 6/1983 | Switzerland . |
| 850559 | 10/1960 | United Kingdom . |

Primary Examiner—Mary C. Lee
Assistant Examiner—Fiona T. Powers
Attorney, Agent, or Firm—Gerald D. Sharkin; Richard E. Vila; Melvyn M. Kassenoff

[57] ABSTRACT

Compounds of the formula

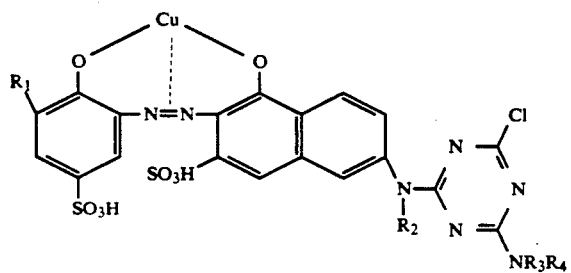

and salts thereof, wherein
$R_1$ is hydrogen, chloro, bromo, carboxy or sulfo,
$R_2$ is hydrogen or $C_{1-4}$ alkyl,
$R_3$ is hydrogen, $C_{1-4}$ alkyl or $C_{1-4}$ hydroxyalkyl, and
$R_4$ is $C_{1-6}$ alkyl monosubstituted by carboxy or sulfo; $C_{2-6}$ alkyl monosubstituted by hydroxy or —$OR_5$; $C_{2-6}$ dihydroxyalkyl the hydroxy groups of which are on different carbon atoms; phenyl or phenyl monosubstituted or disubstituted by $C_{1-4}$ alkyl,
wherein $R_5$ is $C_{2-4}$ hydroxyalkyl, with the proviso that when each of $R_1$, $R_2$ and $R_3$ is hydrogen, $R_4$ is other than 2-hydroxyethyl,
and mixtures of such complexes and salts, useful for dyeing or printing hydroxy group- or nitrogen-containing organic substrates, for example leather and fiber materials containing or consisting of natural or synthetic polyamides or of natural or regenerated cellulose, preferably textile material containing or consisting of cotton.

20 Claims, No Drawings

1:1 COPPER COMPLEXES OF FURTHER UNSUBSTITUTED OR SUBSTITUTED 6-(2'-CHLORO-4'-SUBSTITUTED AMINO-1,3,5-TRIAZIN-6'-YLAMINO)-1-HYDROXY-2-(2'-HYDROXY-5'-SULFOPHENYLAZO)-3-SULFONAPHTHALENES

This is a continuation of application Ser. No. 07/289,170, filed Dec. 23, 1988 and now abandoned, which is a continuation of application Ser. No. 06/931,384, filed Nov. 14, 1986 and now abandoned.

This invention relates to metallised monochlorotriazinyl monoazo compounds, their preparation and their use as fibre-reactive dyes.

According to the invention there is provided compounds of formula I

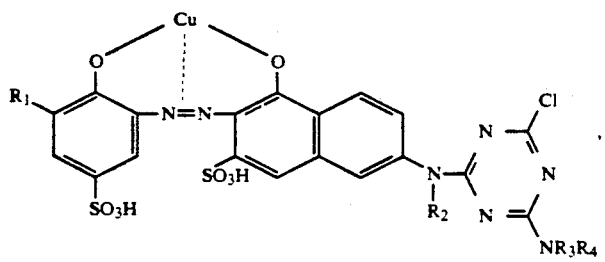

(I)

in free acid or salt form, in which
$R_1$ is hydrogen, chlorine, bromine, carboxy or sulpho,
$R_2$ is hydrogen or $C_{1-4}$alkyl,
$R_3$ is hydrogen, $C_{1-4}$alkyl or $C_{1-4}$hydroxyalkyl, and
$R_4$ is $C_{1-6}$alkyl monosubstituted by carboxy or sulpho, $C_{2-6}$alkyl substituted by one or two hydroxy groups or by one group $-OR_5$, phenyl or phenyl substituted by one or two $C_{1-4}$alkyl groups,
wherein $R_5$ is $C_{2-4}$hydroxyalkyl,
provided that $R_4$ is other than 2-hydroxyethyl when each of $R_1$, $R_2$ and $R_3$ is hydrogen, and mixtures of compounds of formula I which are in free acid or salt form.

In the specification, any alkyl or substituted alkyl group present is linear or branched unless indicated otherwise. In any alkyl group substituted by hydroxy or $-OR_5$, which is attached to a nitrogen atom, the hydroxy group or $-OR_5$ group is preferably bound to a carbon atom other than the $C_1$-atom. In any alkyl group as $R_4$ containing two hydroxy groups, the hydroxy groups are bound to different carbon atoms.

Any unsubstituted alkyl as $R_2$ or $R_3$ is preferably methyl or ethyl, more preferably methyl.

Any hydroxy-substituted alkyl group as $R_3$ or $R_5$ preferably contains 2 or 3 carbon atoms, especially 2 carbon atoms.

Any alkyl as $R_4$ monosubstituted by carboxy or sulpho is preferably a linear alkyl group containing 1 to 3 carbon atoms, especially 2 carbon atoms. Any monohydroxy-substituted alkyl group as $R_4$ preferably contains 2 or 3 carbon atoms; any dihydroxy-substituted alkyl hy-group preferably contains 3 or 4 carbon atoms, more preferably 3 carbon atoms. Any alkyl group monosubstituted by $-OR_5$ is preferably linear; more preferably,
it is a linear $C_{2-3}$alkyl group containing a terminal group $-OR_5$.

$R_1$ is preferably $R_{1a}$, where $R_{1a}$ is hydrogen, chlorine, carboxy or sulpho. More preferably, it is $R_{1b}$, where $R_{1b}$ is hydrogen, chlorine or sulpho. More preferably, $R_1$ is $R_{1c}$, where $R_{1c}$ is hydrogen or chlorine.

$R_2$ is preferably $R_{2a}$, where $R_{2a}$ is hydrogen, methyl or ethyl. More preferably, it is $R_{2b}$, where $R_{2b}$ is hydrogen or methyl. Most preferably $R_2$ is hydrogen.

$R_3$ is preferably $R_{3a}$, where $R_{3a}$ is hydrogen, methyl, ethyl or $C_{2-3}$hydroxyalkyl. More preferably, it is $R_{3b}$, where $R_{3b}$ is hydrogen, methyl, ethyl or 2-hydroxyethyl. Most preferably, $R_3$ is $R_{3c}$, where $R_{3c}$ is hydrogen, methyl or 2-hydroxyethyl.

$R_5$ is preferably $R_{5a}$, where $R_{5a}$ is 2-hydroxyethyl.

$R_4$ is preferably $R_{4a}$, where $R_{4a}$ is $C_{2-3}$hydroxyalkyl, $C_{3-4}$dihydroxyalkyl, $-(CH_2)_{1-3}SO_3H$, $-(CH_2)_{1-3}COOH$, $-(CH_2)_{2-4}OR_{5a}$,

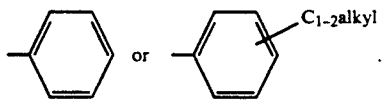

More preferably, $R_4$ is $R_{4b}$, where $R_{4b}$ is $-CH_2CH_2OH$,

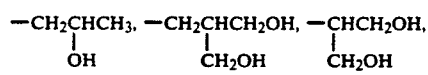

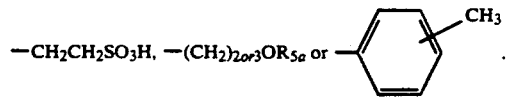

Most preferably, $R_4$ is $R_{4c}$, where $R_{4c}$ is $-CH_2CH_2OH$, $-CH_2CH_2SO_3H$ or

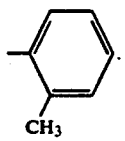

Preferably, $R_3$ is $R_{3b}$, and $R_4$ is $R_{4b}$.

Preferred mixtures of compounds of formula I are 1:1 mixtures (by weight) of a compound wherein $R_1$ is hydrogen and a compound wherein $R_1$ is chlorine, carboxy or sulpho.

Preferred compounds correspond to formula Ia

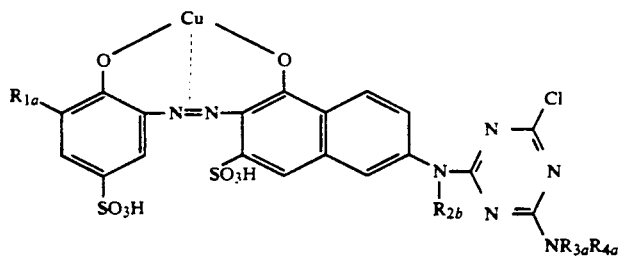

Ia provided that $R_{4a}$ is other than —CH$_2$CH$_2$OH, when each of $R_{1a}$, $R_{2b}$ and $R_{3a}$ is hydrogen, which compounds are in free acid or salt form, and mixtures thereof.

More preferred are compounds of formula Ia in which (1) $R_{1a}$ is $R_{1b}$;
(2) $R_{2b}$ is hydrogen;
(3) $R_{3a}$ is $R_{3c}$ and $R_{4a}$ is $R_{4b}$;
(4) those of (3), in which $R_{4b}$ is $R_{4c}$;
(5) those of (1) wherein $R_{3a}$ is $R_{3c}$, and $R_{4a}$ is $R_{4b}$, especially $R_{4c}$; which $R_{1a}$ is chlorine, carboxy or sulpho;
(6) those of (1) to (5), in which $R_{1a}$ is $R_{1c}$.

Preferred mixtures are 1:1 mixtures (by weight) of two compounds of (1)–(4) in one of which $R_{1a}$ is hydrogen and in the other of which $R_{1a}$ is chlorine, carboxy or sulpho.

When a compound of formula I or Ia is in salt form, the cation associated with the sulpho groups and any carboxy groups is not critical and may be any one of those non-chromophoric cations conventional in the field of fibre-reactive dyes provided that the corresponding salts as obtained are water-soluble. Examples of such cations are alkali metal cations and unsubstituted or substituted ammonium cations, e.g., lithium, sodium, potassium, ammonium, mono-, di-, tri- and tetra-methylammonium, triethylammonium and mono-, di- and tri-ethanolammonium.

The preferred cations are the alkali metal cations and ammonium, with sodium being the most preferred.

Generally, in a compound of formula I or Ia the cations of the sulpho and any carboxy groups can be the same or different, e.g., they can also be a mixture of the above-mentioned cations meaning that the compound can be in mixed salt form.

The invention further provides a process for the preparation of compounds of formula I and mixtures thereof comprising reacting a compound which in free acid form corresponds to formula II

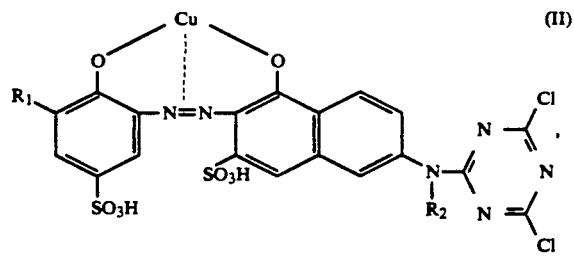

(II)

in which $R_1$ and $R_2$ are as defined above, or a mixture of compounds of formula II with an amine of formula (III),

HNR$_3$R$_4$   III in which $R_3$ and $R_4$ are as defined above, or a mixture of amines of formula III, whereby the condensation of a compound of formula II with an amine of formula III is effected using a 1:1 molar ratio.

This reaction may be effected in accordance with conventional methods.

The compounds of formula I may be isolated in accordance with known methods, for example, by conventional salting out with alkali metal salt, filtering and drying, optionally in vacuo.

Depending on the reaction and isolation conditions a compound of formula I is obtained in free acid or preferably salt form or even mixed salt form containing, for example, one or more of the above-mentioned cations. It may be converted from free acid form to a salt form or mixture of salt forms or vice versa or from one salt form to another by conventional means.

The starting compounds of formula II are either known or may be prepared in accordance with known methods using appropriate starting materials, i.e., by conventional condensation of cyanuric chloride with the corresponding coppered amino monoazo compound.

The amines of formula III are similarly either known or may be prepared analogously to conventional methods.

The compounds of formula I are useful as fibre-reactive dyes for dyeing or printing hydroxy group- or nitrogen-containing organic substrates. The preferred substrates are leather and fibre materials containing or consisting of natural or synthetic polyamides and, particularly, of natural or regenerated cellulose such as cotton, viscose and spun rayon. The most preferred substrate is textile material containing or consisting of cotton.

Dyeing or printing is effected in accordance with known methods. However, it is preferred to use the exhaust dyeing method. There is an advantage that dyeing with these dyestuffs is not temperature dependent in the usual dyeing temperature range. Therefore, dyeing may be effected almost equally well at 80° C. as at 100° C. without any essential loss of fixation yield.

The compounds according to the invention are well compatible with other fibre-reactive dyes; they may be applied per se or in combination with appropriate fibre-reactive dyestuffs of the same class having analogous dyeing properties, e.g., extent of ability to exhaust from the dyebath onto the fibre, common fastness properties with respect to the resulting dyeings, etc. The dyeings obtained with such combination mixtures have good fastness properties.

In view of their notable build-up power the compounds of formula I give high exhaust and fixation yields. The portion of unfixed dye can be easily washed off the substrate. The dyeings obtained show good light fastness and wet fastness properties such as wash, water, sea water and sweat fastness. They are stable to any oxidative influences, e.g., chlorinated water, hypochlorite bleach and peroxide or perborate-containing wash liquors.

The following examples further serve to illustrate the invention. In the examples all parts and percentages are by weight or volume. The temperatures are in degrees Centigrade.

EXAMPLE 1

67.3 Parts of 2-aminophenol-4,6-disulphonic acid are stirred in 100 parts of water and 15 parts of concentrated hydrochloric acid. To this mixture 50 parts of ice are added with external cooling, and diazotisation is effected at ca. 0° by slowly adding 62.5 parts of 4N sodium nitrite solution within 55 minutes. After stirring during ca. 30 minutes, any excess nitrite is decomposed by adding a small amount of sulphamic acid.

59.8 Parts of 2-amino-5-hydroxynaphthalene-7-sulphonic acid are dissolved in 500 parts of water. The pH of this solution is adjusted to 7 by the addition of sodium hydroxide solution. When 125 parts of a 25% ammonia solution have been added, the mixture is cooled to 0°. The cooled diazonium salt solution, prepared as given above, is slowly run into this mixture whilst stirring. Stirring is effected for 30 minutes at room temperature; subsequently the mixture is heated to 40°. After a further 90 minutes, a solution of 63.8 parts of copper sulphate in 300 parts of water is added to the reaction mixture within 30 minutes. The resulting dyestuff is salted out with sodium chloride in accordance with conventional methods and filtered.

The resulting wet presscake containing the coppered monoazo dye is dissolved in 1500 parts of water whilst stirring overnight. To this solution which has been cooled to 0° by external cooling and addition of 500 parts of ice, 46 parts of cyanuric chloride are added at pH 5.4. During the condensation the pH is kept at 5 by adding appropriate amounts of a 20% sodium carbonate solution. The temperature is raised to not higher than 7°. After 2½ hours the reaction is completed. To this reaction solution 30.5 parts of N-methyl-o-toluidine are added at 10° and a pH of 5.2. Reaction is effected whilst maintaining a constant pH of 7.0 to 7.4 by adding a 20% sodium carbonate solution. The temperature is raised to 40°–43°, and the mixture is stirred at this temperature for four hours. After the reaction is completed, the end product is isolated by adding 150% sodium chloride at pH 7, followed by the addition of 250 parts of ethanol 30 minutes later. The dyestuff deposits practically quantitatively in form of a fine precipitate which can be filtered easily and is dried in vacuo at ca. 50°. The resulting dyestuff (A) which, in free acid form, has the formula

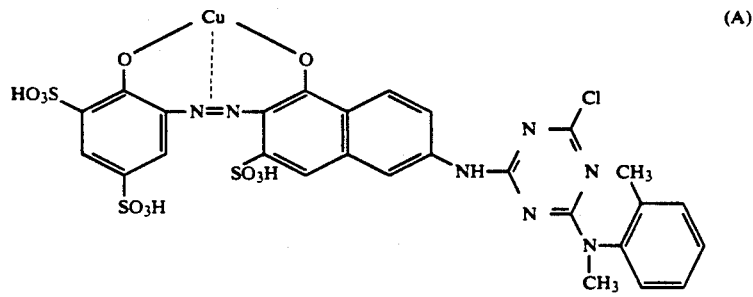

(A)

dyes cotton or regenerated cellulose a ruby-red shade. The dyeings obtained show good light and wet fastness properties and are stable to any oxidative influences.

EXAMPLE 2

When 47.3 parts of 2-aminophenol-4-sulphonic acid are used in Example 1 instead of 67.3 parts of 2-aminophenol-4,6-disulphonic acid, and further preparation is effected in accordance with the method given in Example 1, a dyestuff (B) which, in free acid form, corresponds to the formula

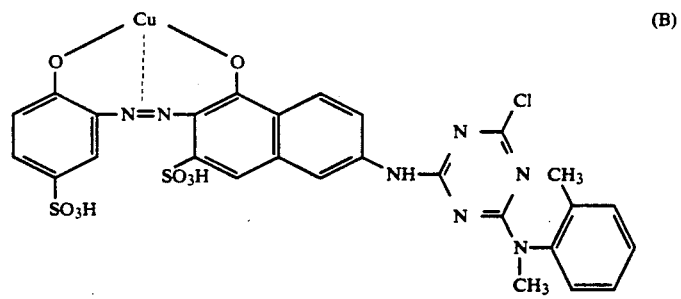

(B)

is obtained. It dyes cotton or regenerated cellulose a ruby-red shade. The dyeings show good light and wet fastness properties and are stable to any oxidative influences.

EXAMPLE 3

When using in Example 1 instead of 67.3 parts of 2-aminophenol-4,6-disulphonic acid a mixture of 33.6 parts of the preceding aminophenol together with 23.6 parts of 2-aminophenol-4-sulphonic acid and applying the preparation method given in Example 1, a dyestuff mixture in which dyes (A) and (B) are present in a ratio of 1:1 (by weight) is obtained. This dyestuff mixture dyes cotton or regenerated cellulose a ruby-red shade. The resulting dyeings have notably good fastness properties, particularly with respect to light and wet fastnesses, and are stable to any oxidative influences.

EXAMPLES 4 TO 40

By analogy with the method described in Examples 1 to 3, using appropriate starting compounds, further compounds of formula I and mixture thereof may be prepared which are listed in the following Table. For the compounds of formula I listed in the below Table $R_2$ is hydrogen and all further symbols are as defined in the Table.

With these dyes listed in the Table, cotton or regenerated cellulose may be dyed using the conventional exhaust dyeing method, whereby in all cases ruby-red dyeings having good fastness properties are obtained.

TABLE

| Ex. No. | $R_1$ | $R_3$ | $R_4$ |
|---|---|---|---|
| 4 | Cl | H | —CH$_2$CH$_2$OH |
| 5 | H/Cl (1:1 ratio by weight, according to Ex. 3) | H | " |
| 6 | SO$_3$H | H | " |
| 7 | COOH | H | " |
| 8 | H/SO$_3$H (1:1 ratio by weight, according to Ex. 3) | H | " |
| 9 | H | —CH$_2$CH$_2$OH | " |
| 10 | Cl | " | " |
| 11 | H/Cl (1:1 ratio by weight, according to Ex. 3) | " | " |
| 12 | H | H | —CH$_2$CHCH$_2$OH<br>            \|<br>            OH |
| 13 | Cl | H | " |
| 14 | SO$_3$H | H | " |
| 15 | H | H | —CHCH$_2$OH<br>  \|<br>  CH$_2$OH |
| 16 | Cl | H | " |
| 17 | Cl | CH$_3$ | —CH$_2$CHCH$_2$OH<br>            \|<br>            OH |
| 18 | H | " | " |
| 19 | COOH | " | " |
| 20 | SO$_3$H | " | " |
| 21 | Cl | CH$_3$ | 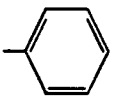 |
| 22 | H/Cl (1:1 ratio by weight, according to Ex. 3) | " | " |
| 23 | COOH | " | " |
| 24 | " | —CH$_2$CH$_2$OH | —CH$_2$CH$_2$OH |
| 25 | H/COOH (1:1 ratio by weight, according to Ex. 3) | CH$_3$ | 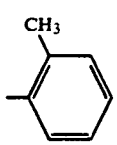 |
| 26 | H/COOH (1:1 ratio by weight, according to Ex. 3) | —CH$_2$CH$_2$OH | —CH$_2$CH$_2$OH |
| 27 | H/COOH | H | " |
| 28 | H | C$_2$H$_5$ | 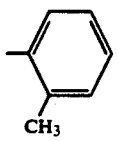 |
| 29 | Cl | " | " |
| 30 | SO$_3$H | " | " |
| 31 | H | H | —CH$_2$CH$_2$SO$_3$H |
| 32 | H | CH$_3$ | " |
| 33 | Cl | " | " |
| 34 | Cl | H | " |
| 35 | H/Cl (1:1 ratio by weight, according to Ex. 3) | H | " |
| 36 | H/Cl (1:1 ratio by weight, according to Ex. 3) | CH$_3$ | " |
| 37 | SO$_3$H | " | " |
| 38 | " | H | " |
| 39 | H/SO$_3$H (1:1 ratio by weight, according to Ex. 3) | H | " |
| 40 | H/SO$_3$H (1:1 ratio by weight, according to Ex. 3) | CH$_3$ | " |

Further dyestuff mixtures analogous to that shown in Example 3 may be prepared by using a mixture of appropriate diazo components in which, for example, $R_1$ is hydrogen and chlorine, or hydrogen and carboxy, or hydrogen and sulpho; together with a mixture of appropriate amines $HNR_3R_4$, such as $H_2NCH_2CH_2OH$ and $HN(CH_2CH_2OH)_2$, or $H_2NCH_2CH_2OH$

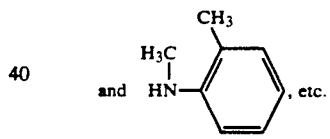

and HN— , etc.

Depending on the ratios (by weight) of the single components of each mixture used which may vary in any desired range, a multi-dye mixture is obtained having more specific dyeing properties than a single dye.

In accordance with the preparation method as described in Examples 1 to 3 the dyestuffs or dyestuff mixtures of Examples 1 to 40 are obtained in sodium salt form. They may, depending on the reaction and isolation conditions or by reacting the sodium salts in accordance with known methods, also be obtained in free acid form or in other salt forms, for example those salt forms containing one or more cations indicated in the description above. It is also possible to prepare mixed salt forms.

In the following examples the application of the dyestuff mixtures of this invention is illustrated.

APPLICATION EXAMPLE A

To a dyebath consisting of 1000 parts of water, 20 parts of Glauber's salt (calcined), 2.5 parts of sodium carbonate (calcined) and 1 part of sodium 1-nitrobenzene-3-sulphonate are added 50 parts of mercerized cotton fabric. The bath is heated to 40°, then 1 part of the dyestuff of Example 1 or 2 or of the dye mixture according to Example 3 is added. The temperature is raised to 98° within 45 minutes; during this time 20 parts of Glauber's salt (calcined) are added after 15 minutes and again 20 parts of Glauber's salt (calcined) are added after a further 15 minutes. At the end of this time 7.5 parts of sodium carbonate (calcined) are added. Dyeing is continued at the boil for 45 to 60 minutes. Subsequently, the dyed fabric is removed from the liquor, rinsed with running hot water, and washed at the boil for 15 minutes in 500 parts of demineralised water in the presence of 0.25 parts of a commercially available anion-active detergent. After rinsing and drying a ruby-red cotton dyeing with good light fastness and wet fastness properties is obtained.

APPLICATION EXAMPLE B

1 Part of the dyestuff Example 1 or 2 or of the dyestuff mixture according to Example 3 is dissolved in 2000 parts of water. 100 Parts of cotton fabric are added and the temperature of the dyebath is raised to 80° within 10 minutes. 100 Parts of Glauber's salt (calcined) are added and 30 minutes thereafter, 20 parts of sodium carbonate (calcined). Dyeing is continued for one hour at 80°. Subsequently, the dyed fabric is rinsed with running cold, then hot, water, and is washed according to the method given for Application Example A. After rinsing and drying a ruby-red cotton dyeing is obtained having good fastness properties.

Similarly, the dyes or dye mixtures of Examples 4 to 40 may be employed to dye cotton in accordance with the method given for Application Example A or B, whereby ruby-red dyeings having good fastness properties are obtained.

APPLICATION EXAMPLE C

A printing paste consisting of
40 parts of the dyestuff of Example 6
100 parts of urea
340 parts of water
500 parts of a 4% sodium alginate thickener, and
20 parts of sodium carbonate
  1000 parts total is applied to cotton fabric in accordance with a conventional printing method.

The printed fabric is dried and fixed in steam at 102°-104° for 4-8 minutes. It is then rinsed with cold and hot water, washed at the boil (according to the method described in Application Example A) and dried. The resulting ruby-red print shows good general fastness properties.

Similarly, the dyes or dye mixtures according to Examples 1 to 5 and 7 to 40 may be employed to print cotton in accordance with the method given for Application Example C. In all cases, ruby-red prints are obtained having good fastness properties.

What is claimed is:
1. A complex of the formula

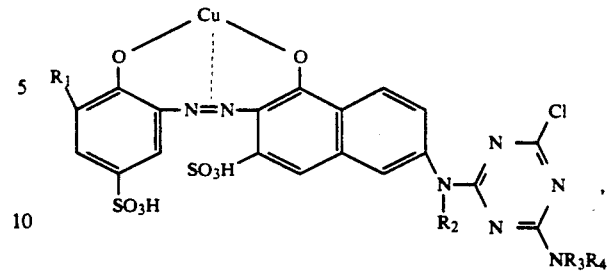

or a water-soluble salt thereof each cation of which is independently a non-chromophoric cation, wherein
  $R_1$ is hydrogen, chloro, bromo, carboxy or sulfo,
  $R_2$ is hydrogen or $C_{1-4}$alkyl,
  $R_3$ is hydrogen, $C_{1-4}$alkyl or $C_{1-4}$hydroxyalkyl, and
  $R_4$ is $C_{1-6}$alkyl monosubstituted by carboxy or sulfo; $C_{2-6}$alkyl monosubstituted by hydroxy or —$OR_5$; $C_{2-6}$dihydroxyalkyl the hydroxy groups of which are on different carbon atoms; phenyl or phenyl monosubstituted or disubstituted by $C_{1-4}$alkyl,
  wherein $R_5$ is $C_{2-4}$hydroxyalkyl, with the proviso that when each of $R_1$, $R_2$ and $R_3$ is hydrogen, $R_4$ is other than 2-hydroxyethyl,
or a mixture of such complexes or water-soluble salts each cation of which is independently a non-chromophoric cation.

2. A complex according to claim 1, or a water-soluble salt thereof each cation of which is independently a non-chromophoric cation.

3. A complex according to claim 2, or a water-soluble salt thereof each cation of which is independently lithium, sodium, potassium, ammonium, methylammonium, dimethylammonium, trimethylammonium, tetramethylammonium, triethylammonium, ethanolammonium, diethanolammonium or triethanolammonium.

4. A complex according to claim 3, or a sodium salt thereof.

5. A complex according to claim 2, or a water-soluble salt thereof each cation of which is independently a non-chromophoric cation, wherein
  $R_3$ is hydrogen, methyl, ethyl or 2-hydroxyethyl, and
  $R_4$ is 2-hydroxyethyl, 2-hydroxypropyl, 3-hydroxy-2-(hydroxymethyl)propyl, 2-hydroxy-1-(hydroxymethyl)-ethyl, 2-sulfoethyl, —$(CH_2)_b$—O—$CH_2CH_2OH$ or methylphenyl, wherein b is 2 or 3.

6. A complex according to claim 1 having the formula

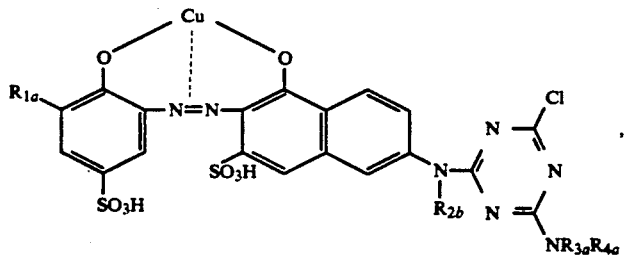

or a water-soluble salt thereof each cation of which is independently a non-chromophoric cation, wherein
  $R_{1a}$ is hydrogen, chloro, carboxy or sulfo,
  $R_{2b}$ is hydrogen or methyl, $R_{3a}$ is hydrogen, methyl, ethyl or $C_{2-3}$hydroxyalkyl, and $R_{4a}$ is $C_{2-3}$hydroxyalkyl, $C_{3-4}$dihydroxyalkyl the hydroxy groups of which are on different carbon atoms, —$(CH_2)_a$—$SO_3H$, —$(CH_2)_a$—COOH, —$(CH_2)_c$—O—$CH_2CH_2OH$, phenyl or $(C_{1-2}alkyl)$phenyl,

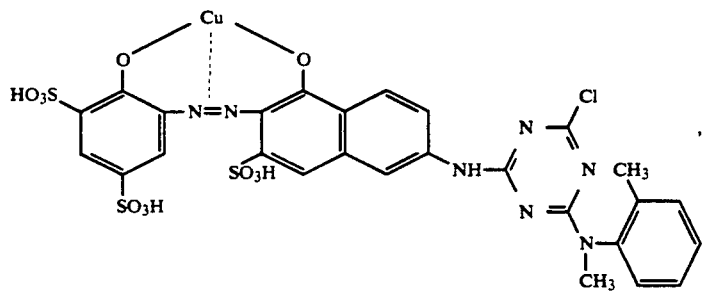

wherein a is 1, 2 or 3, and
c is 2, 3 or 4,
with the proviso that when each of $R_{1a}$, $R_{2b}$ and $R_{3a}$ is hydrogen, $R_{4a}$ is other than 2-hydroxyethyl.

7. A complex according to claim 6, or a water-soluble salt thereof each cation of which is independently a non-chromophoric cation, wherein $R_{2b}$ is hydrogen.

8. A complex according to claim 7, or a water-soluble salt thereof each cation of which is independently a non-chromophoric cation, wherein $R_{1a}$ is hydrogen or chloro.

9. A complex according to claim 6, or a water-soluble salt thereof each cation of which is independently a non-chromophoric cation, wherein $R_{1a}$ is hydrogen, chloro or sulfo.

10. A complex according to claim 9, or a water-soluble salt thereof each cation of which is independently a non-chromophoric cation, wherein
$R_{3a}$ is hydrogen, methyl or 2-hydroxyethyl, and
$R_{4a}$ is 2-hydroxyethyl, 2-hydroxypropyl, 3-hydroxy-2-(hydroxymethyl)propyl, 2-hydroxy-1-(hydroxymethyl)ethyl, 2-sulfoethyl, —$(CH_2)_b$—O—$CH_2CH_2OH$ or methylphenyl,
wherein b is 2 or 3.

11. A complex according to claim 10, or a water-soluble salt thereof each cation of which is independently a non-chromophoric cation, wherein $R_{4a}$ is 2-hydroxyethyl, 2-sulfoethyl or 2-methylphenyl.

12. A complex according to claim 11, or a water-soluble salt thereof each cation of which is independently a non-chromophoric cation, wherein $R_{2b}$ is hydrogen.

13. The complex according to claim 12 having the formula

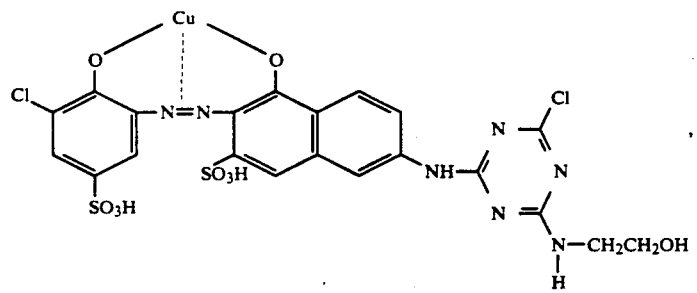

or a water-soluble salt thereof each cation of which is independently a non-chromophoric cation.

14. The complex according to claim 12 having the formula or a water-soluble salt thereof each cation of which is independently a non-chromophoric cation.

15. A mixture of complexes or water-soluble salts each cation of which is independently a non-chromophoric cation according to claim 1.

16. A mixture according to claim 15 consisting of
(i) a complex wherein $R_1$ is hydrogen, or a water-soluble salt thereof each cation of which is independently a non-chromophoric cation, and
(ii) a complex wherein $R_1$ is chloro, carboxy or sulfo, or a water-soluble salt thereof each cation of which is independently a non-chromophoric cation,
the weight ratio of (i) to (ii) being 1:1.

17. A mixture according to claim 16 wherein each $R_2$ is hydrogen,
each $R_3$ is independently hydrogen, methyl or 2-hydroxyethyl, and
each $R_4$ is independently 2-hydroxyethyl, 2-sulfoethyl or 2-methylphenyl.

18. A mixture according to claim 17 wherein
the $R_3$'s are identical, and
the $R_4$'s are identical.

19. A mixture according to claim 18 consisting of
(i) the complex of the formula

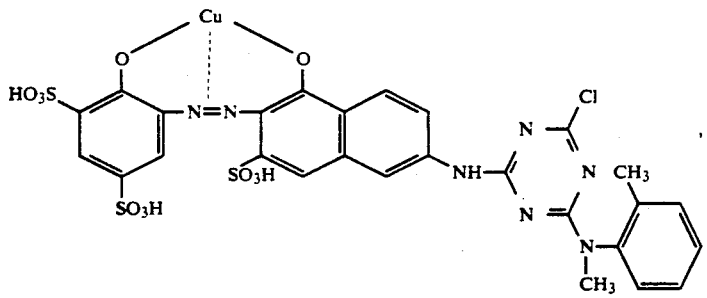

or a water-soluble salt thereof each cation of which is independently a non-chromophoric cation, and (ii) the complex of the formula

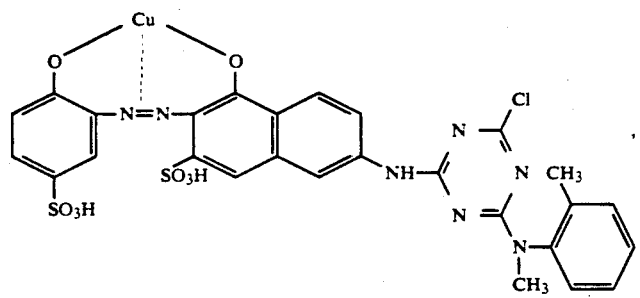

or a water-soluble salt thereof each cation of which is independently a non-chromophoric cation, the weight ratio of (i) to (ii) being 1:1.

20. A process for dyeing or printing an hydroxy group-or nitrogen-containing organic substrate comprising applying to said substrate complex or mixture according to claim 16 as dyeing or printing agent.

* * * * *